United States Patent
Chiu

(10) Patent No.: US 12,394,017 B2
(45) Date of Patent: Aug. 19, 2025

(54) IMAGE ANALYSIS MODEL ESTABLISHMENT METHOD AND IMAGE ANALYSIS APPARATUS

(71) Applicant: VIVOTEK INC., New Taipei (TW)

(72) Inventor: Shu-Shu Chiu, New Taipei (TW)

(73) Assignee: VIVOTEK INC., New Taipei (TW)

( * ) Notice: Subject to any disclaimer, the term of this patent is extended or adjusted under 35 U.S.C. 154(b) by 415 days.

(21) Appl. No.: 18/070,475

(22) Filed: Nov. 29, 2022

(65) Prior Publication Data

US 2023/0186441 A1    Jun. 15, 2023

(30) Foreign Application Priority Data

Dec. 9, 2021   (TW) .................................. 110146037

(51) Int. Cl.
*G06T 5/10*       (2006.01)

(52) U.S. Cl.
CPC ...... *G06T 5/10* (2013.01); *G06T 2207/20024* (2013.01); *G06T 2207/20076* (2013.01); *G06T 2207/20081* (2013.01)

(58) Field of Classification Search
None
See application file for complete search history.

(56) References Cited

U.S. PATENT DOCUMENTS

| | | | |
|---|---|---|---|
| 12,148,198 B1 * | 11/2024 | Grundhoefer | G06T 5/70 |
| 2010/0014783 A1 * | 1/2010 | Lin | G06F 16/58 |
| | | | 382/307 |
| 2016/0014326 A1 * | 1/2016 | Lee | H04N 23/673 |
| | | | 348/354 |

(Continued)

FOREIGN PATENT DOCUMENTS

| | | |
|---|---|---|
| CN | 109104568 A | 12/2018 |
| CN | 111107357 A | 5/2020 |

OTHER PUBLICATIONS

Rao et al., "Global Filter Networks for Image Classification", 2021, https://doi.org/10.48550/arXiv.2107.00645 (Year: 2021).*

(Continued)

*Primary Examiner* — Chan S Park
*Assistant Examiner* — Promotto Tajrian Islam
(74) *Attorney, Agent, or Firm* — Winston Hsu

(57) ABSTRACT

An image analysis model establishment method is applied to an image analysis apparatus including an imager receiver and an operation processor. The image analysis model establishment method divides a detection image acquired by the imager receiver into a plurality of sub-images and transforms the sub-images from a spatial domain to a frequency domain to generate a plurality of pre-processing frequency domain data, generating an analysis model output layer by an inner product of the plurality of pre-processing frequency domain data transformed via a plurality of masks and several filters through a fully connected multilayer perceptron network, acquiring a predicted result of the detection image in accordance with a category determination result of the analysis model output layer, and comparing the predicted result with a target label to adjust parameters in each transformation phase applied for the plurality of pre-processing frequency domain data in accordance with a comparison result.

18 Claims, 10 Drawing Sheets

(56) References Cited

U.S. PATENT DOCUMENTS

2019/0328243 A1\* 10/2019 Nemati .................. A61B 5/318

OTHER PUBLICATIONS

Benhar et al., "Data preprocessing for heart disease classification: A systematic literaturereview", 2020, https://doi.org/10.1016/j.cmpb.2020.105635 (Year: 2020).\*

Wang et al., "Blur Image Identification with Ensemble Convolution Neural Networks", DOI: https://doi.org/10.1016/j.sigpro.2018.09.027 (Year: 2019).\*

\* cited by examiner

IMAGE ANALYSIS MODEL ESTABLISHMENT METHOD AND IMAGE ANALYSIS APPARATUS

BACKGROUND OF THE INVENTION

1. Field of the Invention

The present invention relates to an image analysis model establishment method and an image analysis apparatus, and more particularly, to an image analysis model establishment method of increasing image analysis efficiency and accuracy and a related image analysis apparatus.

2. Description of the Prior Art

A surveillance camera may lose focus due to weather conditions, external forces, or use fatigue. Even if the surveillance camera performs an automatic focusing function, it is difficult to ensure that the surveillance camera completed the automatic focusing function can continuously capture the clear detection image. The conventional surveillance camera analyzes spatial domain information of the detection image to determine a focus state; however, an amount of the spatial domain information of the detection image is huge, which requires a large-capacity memory unit to store related information of the detection image, and further requires complex computation process and lengthy computation time to determine the focus state of the detection image. Therefore, design of an image recognition method and a related image analysis apparatus of rapidly and accurately determining whether the detection image is in the focus state is an important issue in the surveillance camera industry.

SUMMARY OF THE INVENTION

The present invention provides an image analysis model establishment method of increasing image analysis efficiency and accuracy and a related image analysis apparatus for solving above drawbacks.

According to the claimed invention, an image analysis model establishment method is applied to an image analysis apparatus. The image analysis apparatus has an imager receiver and an operation processor. The image analysis model establishment method includes dividing a detection image acquired by the imager receiver into a plurality of sub-images and transforming the plurality of sub-images from a spatial domain to a frequency domain for generating a plurality of pre-processing frequency domain data, generating an analysis model output layer by an inner product of the plurality of pre-processing frequency domain data transformed via a plurality of masks and a plurality of filters through a fully connected multilayer perceptron network, acquiring a predicted result of the detection image in accordance with a category determination result of the analysis model output layer, and comparing the predicted result with a target label to adjust at least one parameter of the plurality of pre-processing frequency domain data in each transformation phase in accordance with a comparison result, so as to optimize a predicted result of next phase.

According to the claimed invention, an image analysis apparatus includes an imager receiver and an operation processor. The imager receiver is adapted to acquire a detection image. The operation processor electrically connected to the imager receiver. The operation processor is adapted to divide the detection image into a plurality of sub-images and transform the plurality of sub-images from a spatial domain to a frequency domain for generating a plurality of pre-processing frequency domain data, to generate an analysis model output layer by an inner product of the plurality of pre-processing frequency domain data transformed via a plurality of masks and a plurality of filters through a fully connected multilayer perceptron network, to acquire a predicted result of the detection image in accordance with a category determination result of the analysis model output layer, and to compare the predicted result with a target label for adjusting at least one parameter of the plurality of pre-processing frequency domain data in each transformation phase in accordance with a comparison result so as to optimize a predicted result of next phase.

The present invention can rapidly and accurately find out the classification rules that optimally match with the input image of the image analysis model and the target label of the expected model by using the frequency domain and the machine learning method of the image analysis model, so as to achieve a purpose of image analysis and identification. The present invention can be applied to a surveillance system or various apparatus that require a focus function to ensure the image focus quality of the product. The image analysis model establishment method and the image analysis apparatus of the present invention can transform the sub-images of the detection image in the spatial domain into the plurality of pre-processing frequency domain data with a three-dimensional matrix-type in the frequency domain. Each layer of the plurality of pre-processing frequency domain data can have the same frequency, so that supervised learning can be used to find out important frequency features that can automatically classify each of the pre-processing frequency domain data, and the classification rules that can judge the focus state of the detection image via the masks and the filters; when the automatic focusing function of the image analysis apparatus is activated, the important frequency features and the classification rules can be used to determine whether the detection image is in the accurate focus state, and the image analysis apparatus can acquire the correct and clear image data. Comparing to the prior art that performs image analysis and processing in the spatial domain, the image analysis model of the present invention has fewer layers in the transformation phase, which is more efficient in learning and maintains preferred image analysis efficiency and accuracy.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
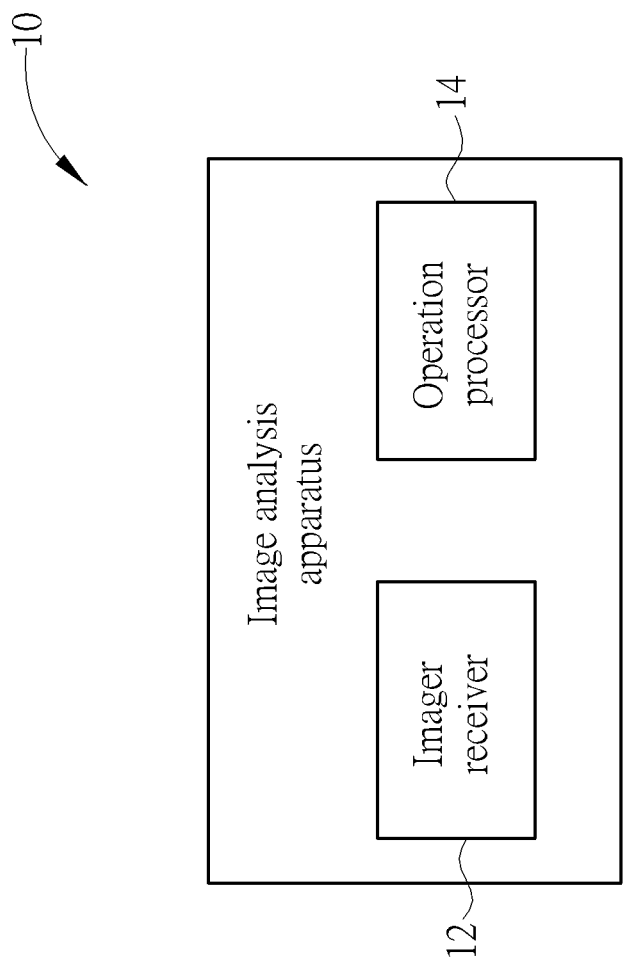
FIG. 1 is a functional block diagram of an image analysis apparatus according to an embodiment of the present invention.

Please refer to FIG. 1. FIG. 1 is a functional block diagram of an image analysis apparatus 10 according to an embodiment of the present invention. The image analysis apparatus 10 can be a webcam with an automatic focusing function, and a detailed description is omitted herein for simplicity. For example, the image analysis apparatus 10 can be applied for a robot vision field, a factory automation field, a self-driving car field, an automatic navigator field, a medical equipment field, and a cloud server field. The image analysis apparatus 10 can include an imager receiver 12 and an operation processor 14 electrically connected to each other. The imager receiver 12 can receive a detection image about a surveillance region of the image analysis apparatus 10. The imager receiver 12 can be a camera used to directly capture the image, or a receiving element used to receive the image captured by an external camera. As an example of the surveillance apparatus, the webcam cam be disposed on outdoor space, and the automatic focusing function may be occasionally activated due to specific environmental factors; the operation processor 14 can analyze focus sharpness or other image parameters of the detection image, to ensure whether the detection image acquired by the imager receiver 12 with the activated automatic focusing function is in a focus state, or ensure whether one or some specific parameters of the detection image conforms to a preset condition.

Figure 2:
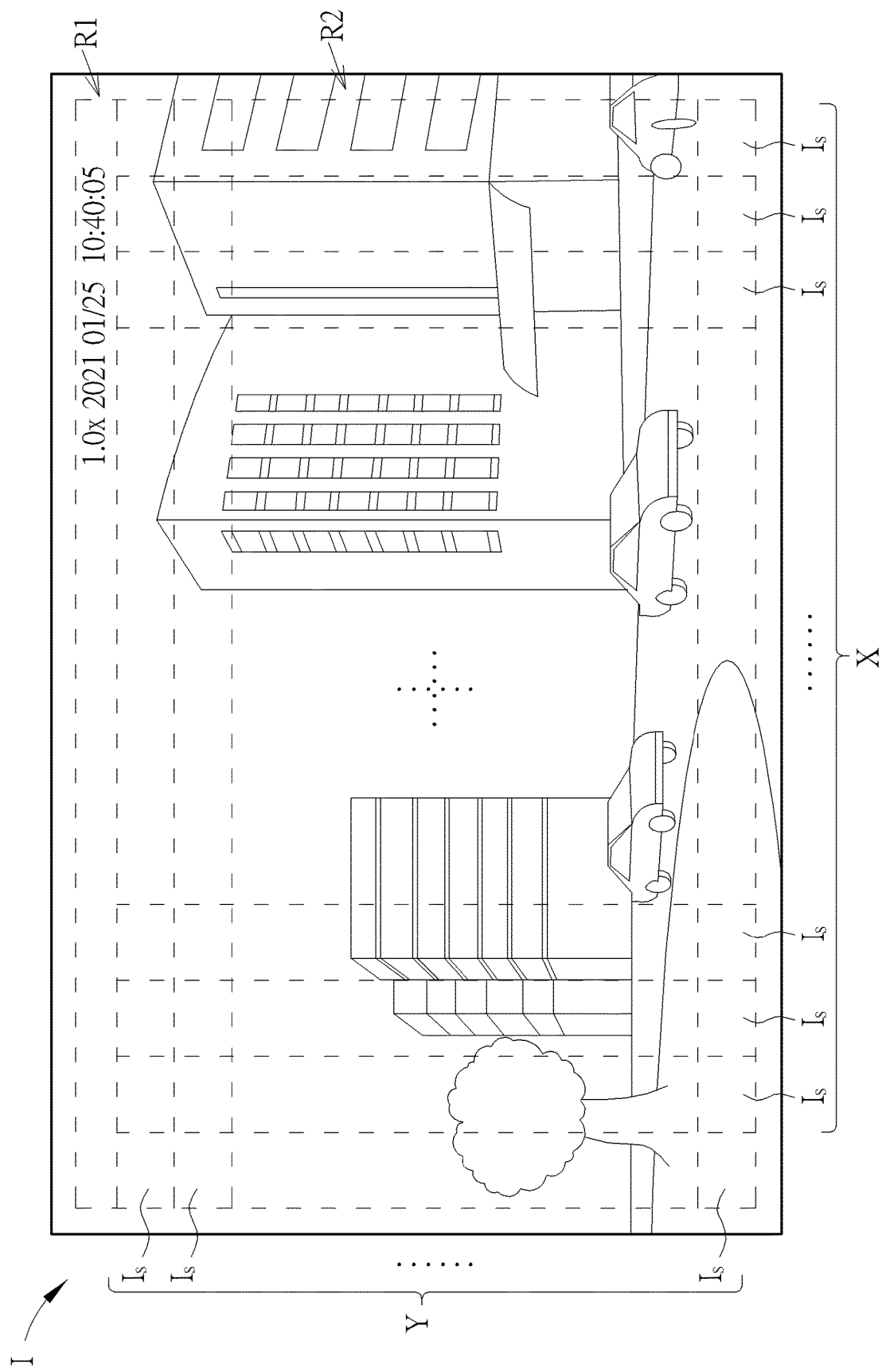
FIG. 2 is a diagram of a detection image acquired by the image analysis apparatus according to the embodiment of the present invention.
Figure 3:
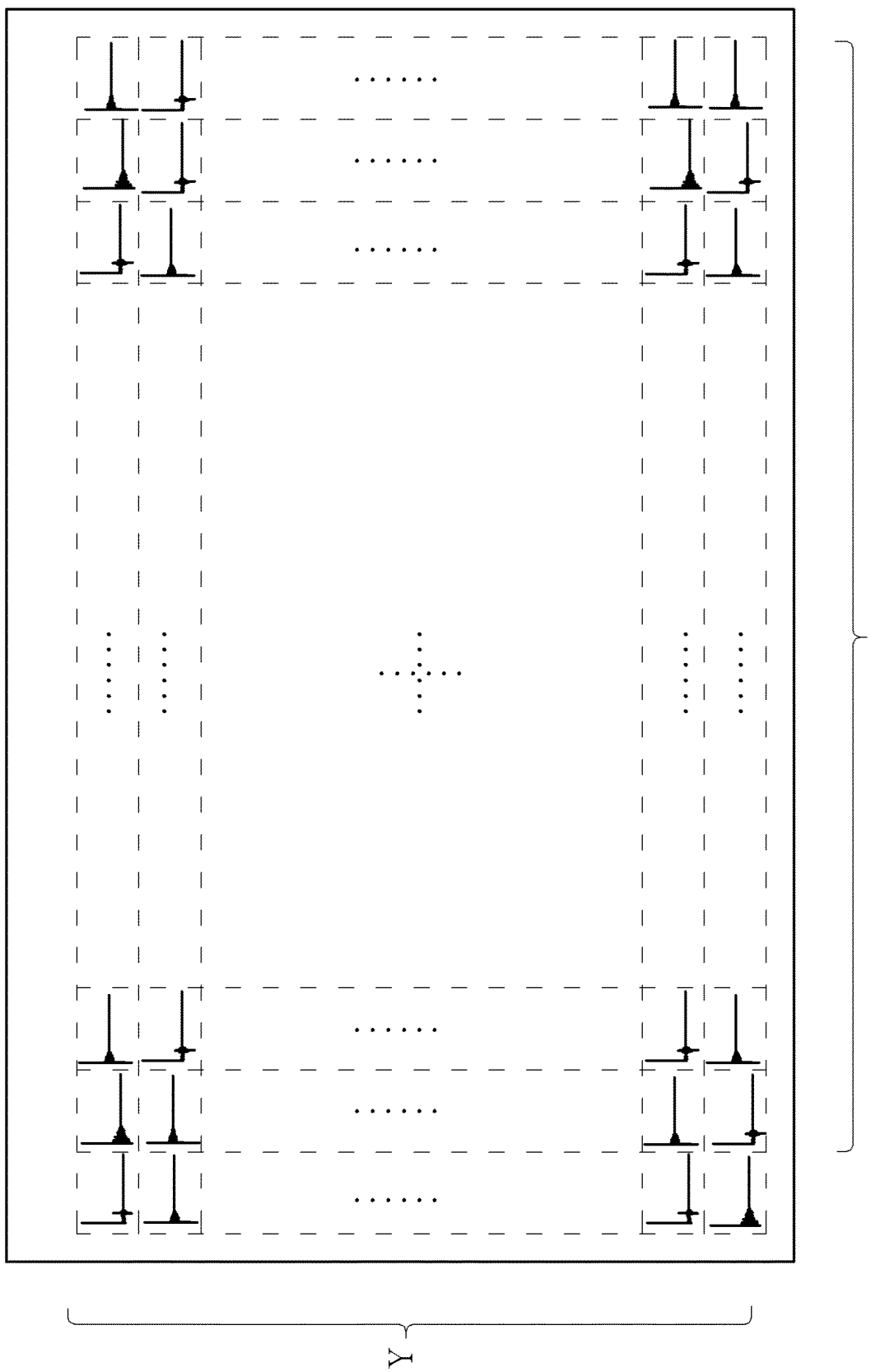
FIG. 3 is a diagram of the detection image in one frequency domain transformation phase according to the embodiment of the present invention.
Figure 4:
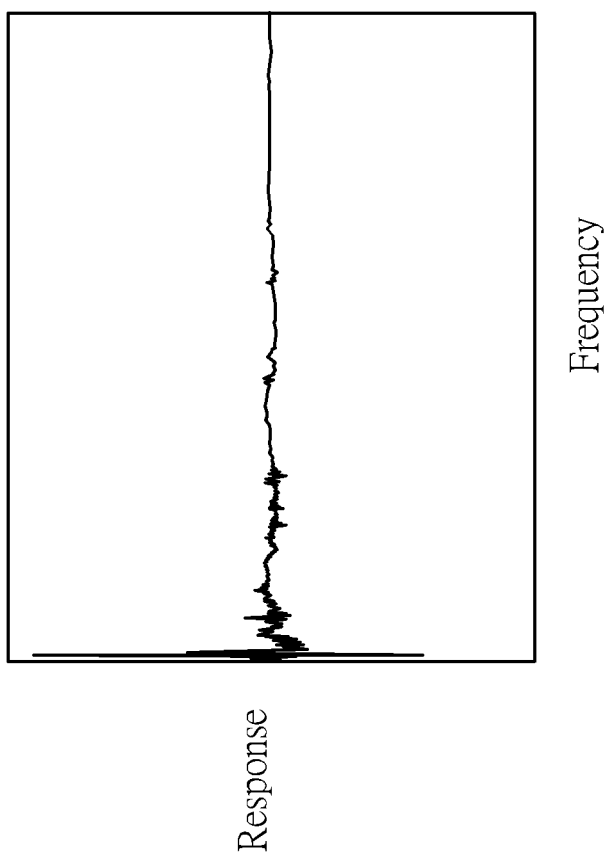
FIG. 4 is a diagram of one sub-image transformed into a frequency domain according to the embodiment of the present invention.
Figure 5:
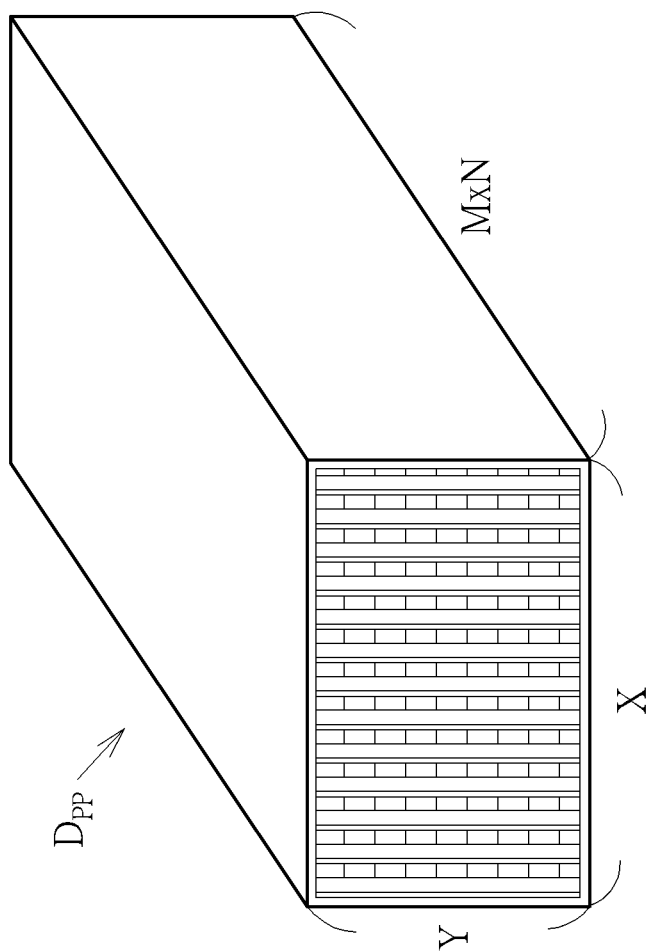
FIG. 5 and FIG. 6 are diagrams of the detection image in other frequency domain transformation phases according to the embodiment of the present invention.
Figure 6:
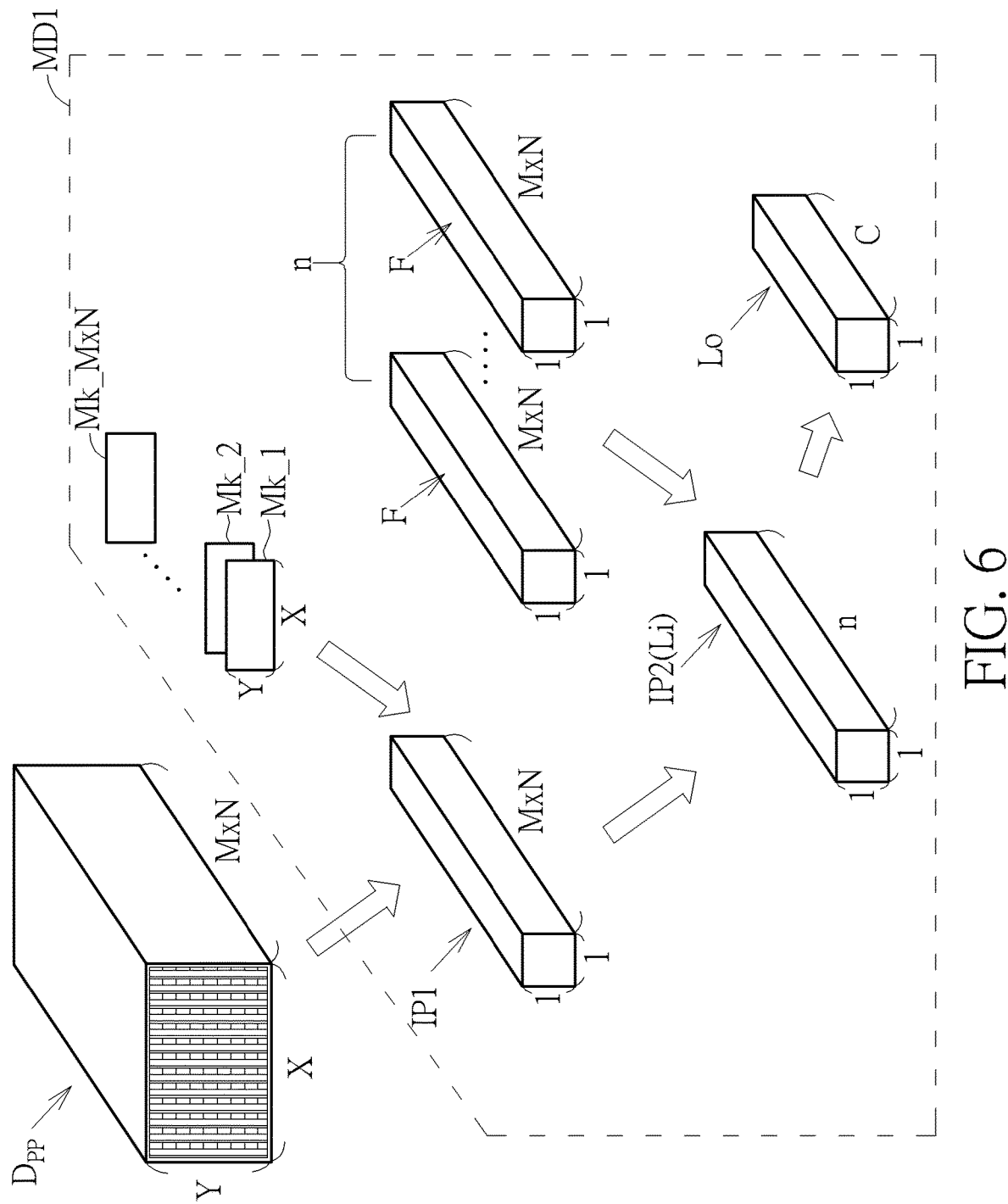
Figure 7:
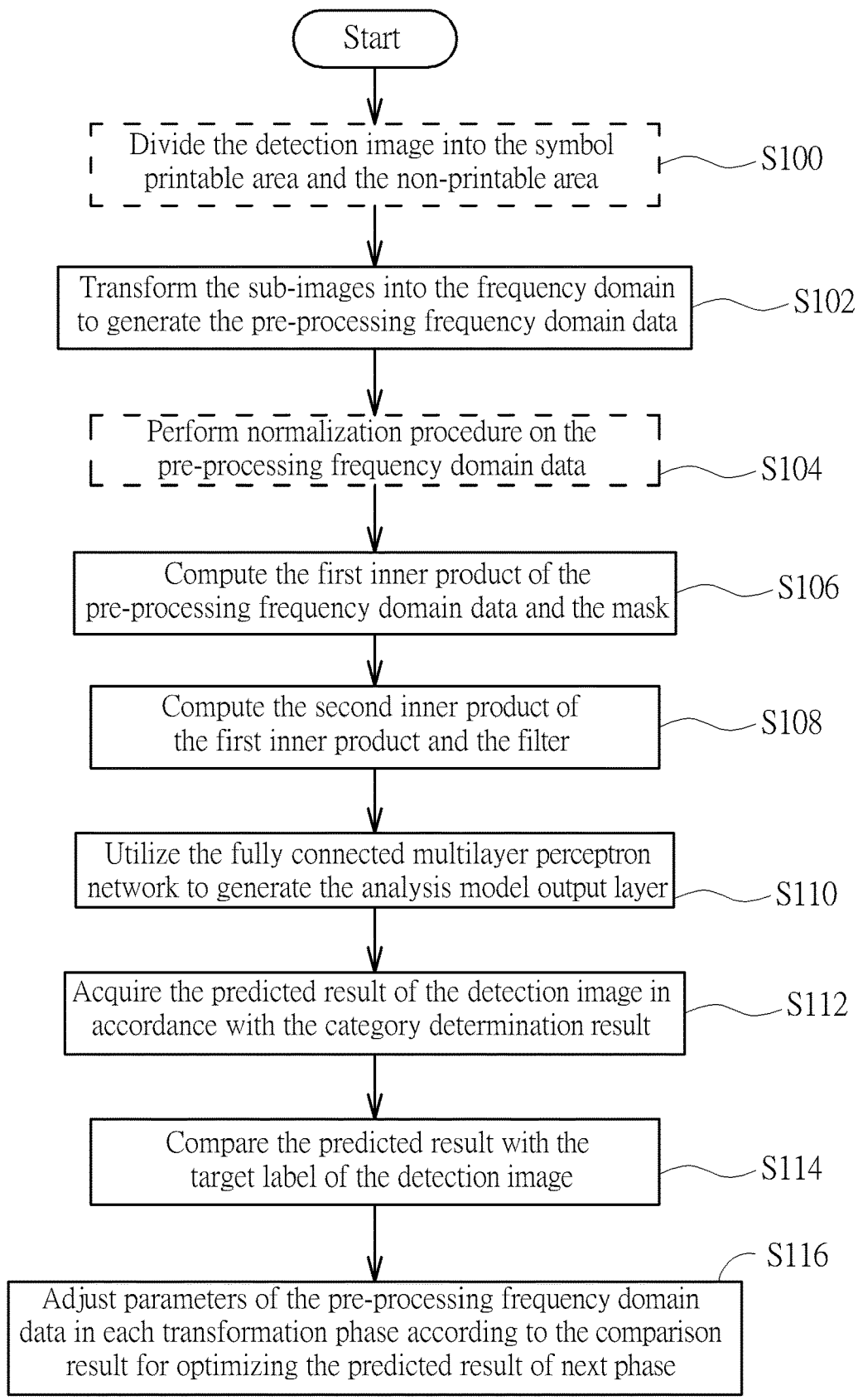
FIG. 7 is a flow chart of an image analysis model establishment method according to the embodiment of the present invention.

Please refer to FIG. 2 to FIG. 6. FIG. 2 is a diagram of the detection image I acquired by the image analysis apparatus 10 according to the embodiment of the present invention. FIG. 3, FIG. 5 and FIG. 6 are diagrams of the detection image I in different frequency domain transformation phases according to the embodiment of the present invention. FIG. 4 is a diagram of a sub-image Is transformed into a frequency domain according to the embodiment of the present invention. FIG. 7 is a flow chart of an image analysis model establishment method according to the embodiment of the present invention. The image analysis apparatus 10 shown in FIG. 1 can execute the image analysis model establishment method illustrated in FIG. 7 for determining whether the detection image I is in the focus state. In the image analysis model establishment method, step S100 can be optionally executed to divide the detection image I into a symbol printable area R1 and a non-printable area R2, and divide the non-printable area R2 into a plurality of sub-images Is via a preset value. The symbol printable area R1 can be an area of the detection image I showing a serial number, an actuation date or an actuation period of the image analysis apparatus 10; position of the serial number, the actuation date and the actuation period is not limited to an upper portion of the detection image I. The non-printable area R2 can be a main area of the detection image I which covers the surveillance region.

The symbol printable area R1 can be adjacent to the non-printable area R2, or can be partly overlapped with the non-printable area R2, or can be spaced from the non-printable area R2 in a specific distance. Besides, any two adjacent sub-images Is of the plurality of sub-images Is can be adjacent to each other, or be partly overlapped with each other, or can be spaced from each other in the specific distance. Relation between the symbol printable area R1 and the non-printable area R2, and relation between the adjacent sub-images Is are not limited to the above-mentioned embodiments, and depend on a design demand.

Figure 8:
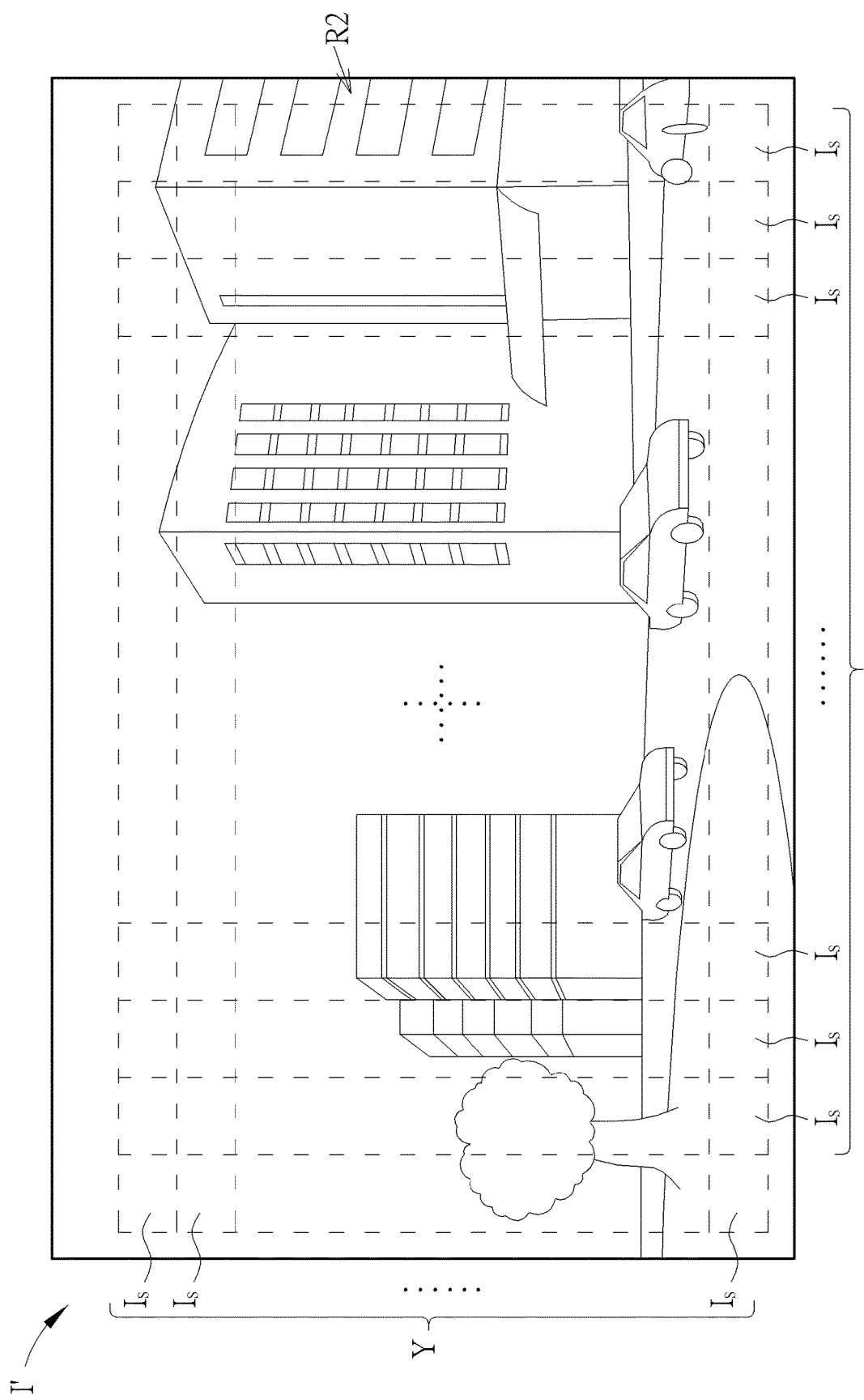
FIG. 8 is a diagram of the detection image divided into the plurality of sub-images according to another embodiment of the present invention.

Please refer to FIG. 8. FIG. 8 is a diagram of the detection image I' divided into the plurality of sub-images Is according to another embodiment of the present invention. In other possible embodiment, the image analysis apparatus 10 may not divide the detection image I' into the symbol printable area R1 and the non-printable area R2, but defines a specific range of the detection image I' as the non-printable area R2 and then divides the non-printable area R2 into the plurality of sub-images Is via the preset value. Therefore, in step S100 shown in FIG. 7, the symbol printable area R1 and the non-printable area R2 may be not divided optionally, and the image analysis model establishment method can pre-define the range of the non-printable area R2 and then divide the sub-images Is. The foresaid specific range can be a center range of the detection image I'; position of the specific range can depend on observation habits of human vision, and the detailed description is omitted herein for simplicity.

Then, step S102 can be executed to transform the plurality of sub-images Is from a spatial domain into a frequency domain for generating a plurality of pre-processing frequency domain data Dpp. Due to lossless compression, frequency independent, use of real numbers and other features of discrete cosine transformation (DCT), the present invention can preferably utilize the discrete cosine transformation to transform the sub-image Is into the frequency domain; the discrete cosine transformation is selected because of its preferred computation efficiency, but actual application is not limited to the foresaid embodiment. For example, Fourier transformation (FFT) or wavelet analysis can be applied, which depends on an actual demand. As the embodiment shown in FIG. 2, FIG. 3 and FIG. 5, an image size of the detection image I can have 2560×1440 pixels, an area size of the symbol printable area R1 can have 2560×160 pixels, and an area size of the non-printable area R2 can have 2560×1280 pixels. If the image size of each of the plurality of sub-images Is is designed as M×N pixels, which can be interpreted as the foresaid preset value, the plurality of sub-images Is can be transformed into the pre-processing frequency domain data Dpp with M×N layers. Symbols M and N can be positive values greater than or equal to 1, such as 64×64.

In the example, each sub-image Is can have 64×64 pixels, which means the foresaid M×N pixels. The non-printable area R2 of the detection image I can be composed of the sub-images Is with XY matrix, and the values of X and Y can be 40 and 20. Each sub-image Is can correspond to one frequency domain graph. The plurality of sub-images Is can generate the pre-processing frequency domain data Dpp with a size shown in FIG. 5. As shown in FIG. 4, a horizontal axis of each frequency domain graph can correspond to a depth value "M×N" of the pre-processing frequency domain data Dpp, which means the pre-processing frequency domain data Dpp with M×N layers. A vertical axis of each frequency domain graph can correspond to change of frequency response. If step S104 is executed optionally, the frequency response of the plurality of pre-processing frequency domain data Dpp outside a specific signal amplitude range can be excluded for performing normalization procedure. The embodiment can preferably set that frequency domain data of the frequency domain graph within the signal strength of the frequency response between plus or minus 64 can be designed as the specific signal amplitude range, and the actual application is not limited the foresaid embodiment; for example, the present invention can adjust the specific signal amplitude range in accordance with a training result and a predicted result of the image analysis apparatus 10, and choose a value achieving an optimal prediction result as reference of the normalization procedure, so as to converge and stabilize an image analysis model.

Then, step S106 and step S108 can be executed to compute inner products of each of the plurality of pre-processing frequency domain data Dpp and a corresponding mask of the plurality of masks Mk for generating a first inner product IP1, and compute an inner product of the first inner product IP1 and the plurality of filters F for generating a second inner product IP2; the second inner product IP2 can be set as an input layer Li of the fully connected multilayer perceptron network. As shown in FIG. 6, a number of masks Mk can be M×N. The M×N masks Mk can be respectively matched with each of the plurality of pre-processing frequency domain data Dpp having the depth value from 1 to M×N, for computing the inner products and setting as the first inner product IP1 with a size of 1×1×"M×N". The first inner product IP1 can be matched with the filters F (having a number of n) for computing the inner product and setting as the second inner product IP2 with a size of 1×1×n. Related information of the mask Mk and the filter F can be defined in accordance with the design demand of the image analysis model establishment method or the image analysis apparatus, and the detailed description is omitted herein for simplicity.

Then, step S110 and step S112 can be executed to set the second inner product IP2 as the input layer Li of the fully connected multilayer perceptron network and utilize the fully connected multilayer perceptron network to generate an analysis model output layer Lo, and acquire the predicted result of the detection image I in accordance with a category determination result of the analysis model output layer Lo, as shown in FIG. 6. The analysis model output layer Lo can optionally include several prediction categories C. In the embodiment of the present invention, the analysis model output layer Lo can optionally include four prediction categories, such as a focus category, a slightly out of focus category, an obviously out of focus category, and a completely out of focus category. The image analysis model establishment method can analyze distribution probability of all numerical results of the input layer Li related to the several prediction categories of the analysis model output layer Lo to acquire the category determination result; for example, if the analysis model output layer Lo has highest distribution probability in the focus category, the detection image I is considered as in the focus state (which means its predicted result). A number of the prediction categories and definition of each prediction category can be designed in accordance with a focus demand of the image analysis apparatus 10, and other possible variation is omitted herein for simplicity.

When the predicted result is acquired, step S114 and step S116 can be executed to compare the predicted result with a target label of the detection image I for computing a noise, and then determine how to adjust the parameters of the plurality of pre-processing frequency domain data Dpp in each transformation phase according to the noise, so as to optimize the predicted result of next phase for finding an optimal analysis model. A first transformation phase of the image analysis model can be executed via the pre-processing frequency domain data Dpp and the mask Mk, a second transformation phase of the image analysis model can be executed via the first inner product IP1 and the filter F, and a third transformation phase of the image analysis model can be executed via the second inner product IP2 and the fully connected multilayer perceptron network. A layer number and applied data of the transformation phases are not limited to the foresaid embodiment, and can be changed in accordance with the design demand of the image analysis model. The foresaid parameters can be one or some weightings, variables or features of the mask Mk, the filter F and/or the fully connected multilayer perceptron network, and the detailed description is omitted herein for simplicity. In step S116, the present invention can adjust weights of each predicted result of all the prediction categories C in accordance with appearing probability of each prediction category C, so as to directly determine whether and how to adjust the parameters and amplitude of the adjusted parameters of the pre-processing frequency domain data Dpp in different transformation phases via the noise of the predicted result and the target label, and further to ensure that the applicable machine learning model can acquire useful frequency features and classification rules for an aim of maximizing correct classification.

Figure 9:
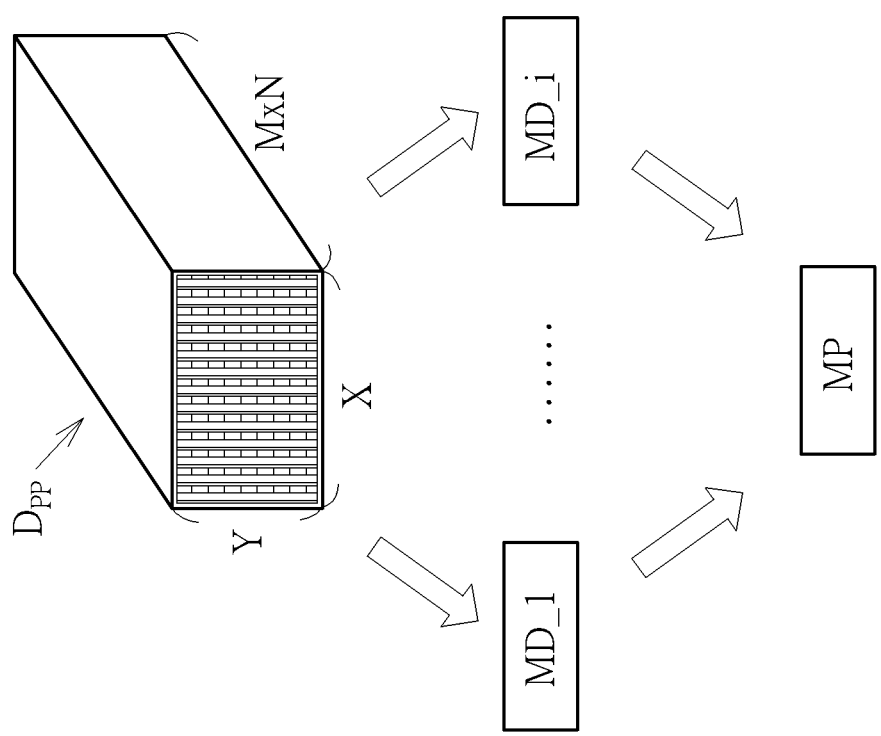
FIG. 9 is a diagram of the embodiment shown in FIG. 6 in another variation.
Figure 10:
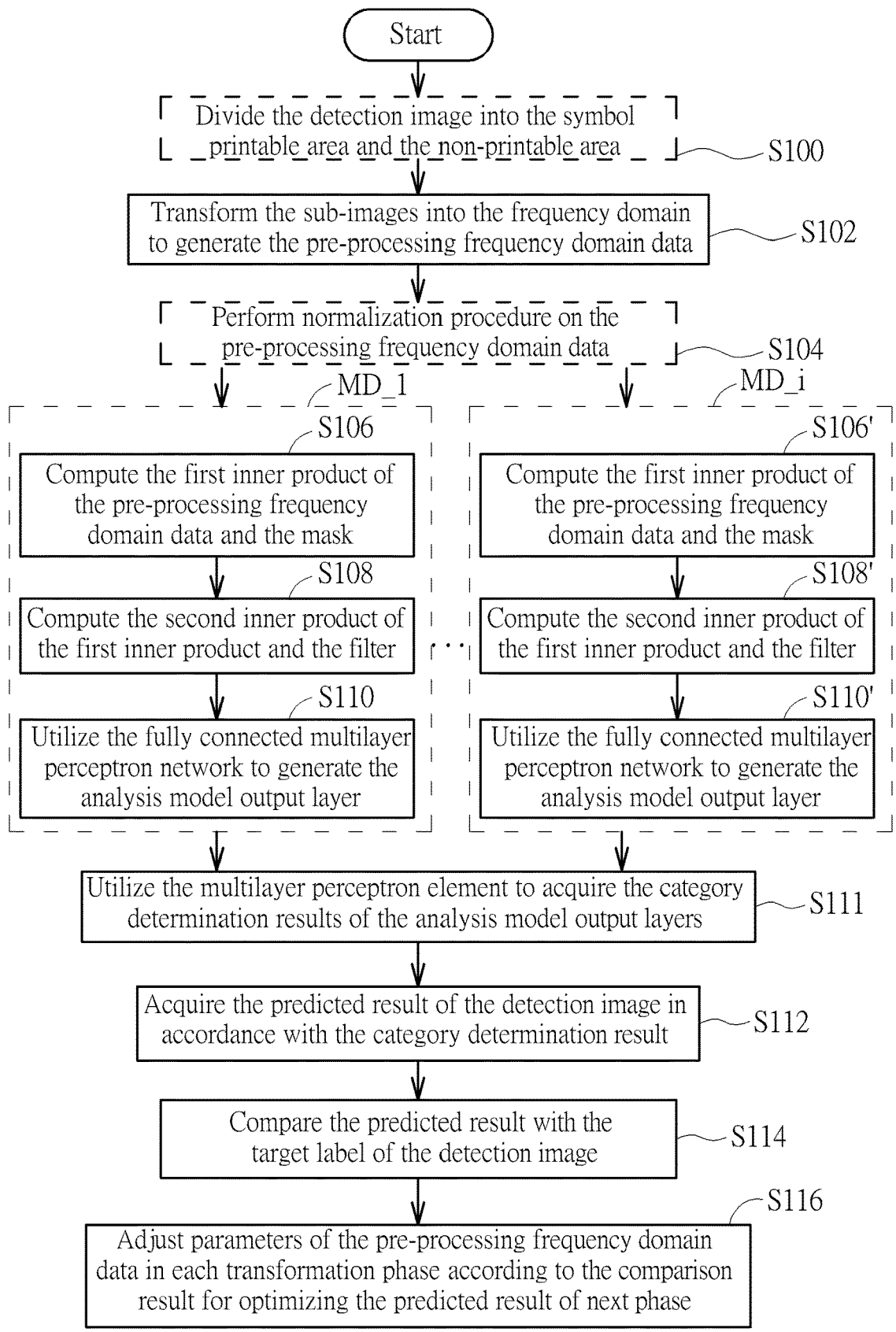
FIG. 10 is a flow chart of the embodiment shown in FIG. 7 in another variation.

Please refer to FIG. 9 and FIG. 10. FIG. 9 is a diagram of the embodiment shown in FIG. 6 in another variation. FIG. 10 is a flow chart of the embodiment shown in FIG. 7 in another variation. When the plurality of pre-processing frequency domain data Dpp is acquired after execution of step S102 and step S104, a number of the learning model can be increased in accordance with the actual demand, such as the learning models MD_1~MD_i. Each learning model can utilize a specific mask Mk, a specific filter F and a specific fully connected multilayer perceptron network to acquire another analysis model output layer (which is not marked in the figures for simplicity). Then, the image analysis apparatus 10 can utilize a multilayer perceptron element MP to acquire the category determination results of the analysis model output layers. As shown in FIG. 10, after execution of step S104, steps S106, S108 and S110 of the learning model MD_1, and steps S106', S108' and S110' of the learning model MD_i can be executed accordingly; a number of the learning models MD_1~MD_i can depend on the design demand, and is not limited to the embodiment shown in FIG. 10. Then, step S111 can be executed to utilize the multilayer perceptron element MP to acquire the category determination results of the analysis model output layers generated by the learning models MD_1~MD_i, and step S112 and step S114 can be executed for accomplishing the image analysis model establishment method of the present invention.

In conclusion, the present invention can rapidly and accurately find out the classification rules that optimally match with the input image of the image analysis model and the target label of the expected model by using the frequency domain and the machine learning method of the image analysis model, so as to achieve a purpose of image analysis and identification. The present invention can be applied to a surveillance system or various apparatus that require a focus function to ensure the image focus quality of the product. The image analysis model establishment method and the image analysis apparatus of the present invention can transform the sub-images of the detection image in the spatial domain into the plurality of pre-processing frequency domain data with a three-dimensional matrix-type in the frequency domain. Each layer of the plurality of pre-processing frequency domain data can have the same frequency, so that supervised learning can be used to find out important frequency features that can automatically classify each of the pre-processing frequency domain data, and the classification rules that can judge the focus state of the detection image via the masks and the filters; when the automatic focusing function of the image analysis apparatus is activated, the important frequency features and the classification rules can be used to determine whether the detection image is in the accurate focus state, and the image analysis apparatus can acquire the correct and clear image data. Comparing to the prior art that performs image analysis and processing in the spatial domain, the image analysis model of the present invention has fewer layers in the transformation phase, which is more efficient in learning and maintains preferred image analysis efficiency and accuracy.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image analysis model establishment method applied to an image analysis apparatus, the image analysis apparatus having an imager receiver and an operation processor, the image analysis model establishment method comprising:
   the operation processor dividing a detection image acquired by the imager receiver into a plurality of sub-images and transforming the plurality of sub-images from a spatial domain to a frequency domain for generating a plurality of pre-processing frequency domain data;
   the operation processor computing inner products of each of the plurality of pre-processing frequency domain data and a corresponding mask of the plurality of masks to generate a first inner product, and computing an inner product of the first inner product and the plurality of filters to generate a second inner product for inputting into a fully connected multilayer perceptron network for generating an analysis model output layer;
   the operation processor acquiring a predicted result of the detection image in accordance with a category determination result of the analysis model output layer; and
   the operation processor comparing the predicted result with a target label to adjust a parameter of the plurality of pre-processing frequency domain data in each transformation phase in accordance with a comparison result, so as to optimize a predicted result of next phase.

2. The image analysis model establishment method of claim 1, further comprising:
   the operation processor generating another analysis model output layer by another result of the plurality of pre-processing frequency domain data transformed via other masks and other filters through another fully connected multilayer perceptron network; and
   the operation processor utilizing a multilayer perceptron element to acquire the category determination results of the analysis model output layer and the another analysis model output layer.

3. The image analysis model establishment method of claim 1, further comprising:
   the operation processor dividing a non-printable area of the detection image into the plurality of sub-images in accordance with a preset value.

4. The image analysis model establishment method of claim 3, further comprising:
   the operation processor dividing the detection image into the non-printable area and a symbol printable area, wherein the symbol printable area is an area of the detection image having a serial number, an actuation date or an actuation period of the image analysis apparatus.

5. The image analysis model establishment method of claim 1, wherein each sub-image of the plurality of sub-images has M×N pixels, the operation processor transforms the plurality of sub-images into the pre-processing frequency domain data with M×N layers by discrete cosine transformation, a number of the plurality of masks is M×N, and M, N are positive values greater than or equal to 1.

6. The image analysis model establishment method of claim 1, further comprising:
   the operation processor performing normalization procedure by excluding frequency response of the plurality of pre-processing frequency domain data outside a specific signal amplitude range.

7. The image analysis model establishment method of claim 1, further comprising:
   the operation processor computing a noise between the predicted result and the target label, and determining how to adjust the parameter of the plurality of pre-processing frequency domain data in each transformation phase in accordance with the noise.

8. The image analysis model establishment method of claim 1, wherein the analysis model output layer comprises a plurality of prediction categories, the operation processor analyzes distribution probability of all numerical results of the second inner product related to the plurality of prediction categories to acquire the category determination result.

9. The image analysis model establishment method of claim 8, wherein the predicted result is a prediction category of the detection image having highest distribution probability among the plurality of prediction categories.

10. An image analysis apparatus, comprising:
    an imager receiver adapted to acquire a detection image; and
    an operation processor electrically connected to the imager receiver, the operation processor being adapted to divide the detection image into a plurality of sub-images and transform the plurality of sub-images from a spatial domain to a frequency domain for generating a plurality of pre-processing frequency domain data, to compute inner products of each of the plurality of pre-processing frequency domain data and a corresponding mask of the plurality of masks to generate a first inner product and further compute an inner product of the first inner product and the plurality of filters to generate a second inner product for inputting into a fully connected multilayer perceptron network for generating an analysis model output layer, to acquire a predicted result of the detection image in accordance with a category determination result of the analysis model output layer, and to compare the predicted result with a target label for adjusting a parameter of the plurality of pre-processing frequency domain data in each transformation phase in accordance with a comparison result so as to optimize a predicted result of next phase.

11. The image analysis apparatus of claim 10, wherein the operation processor is further adapted to generate another analysis model output layer by another result of the plurality of pre-processing frequency domain data transformed via other masks and other filters through another fully connected multilayer perceptron network, and to utilize a multilayer perceptron element for acquiring the category determination result of the analysis model output layer and the another analysis model output layer.

12. The image analysis apparatus of claim 10, wherein the operation processor is further adapted to divide a non-printable area of the detection image into the plurality of sub-images in accordance with a preset value.

13. The image analysis apparatus of claim 12, wherein the operation processor is further adapted to divide the detection image into the non-printable area and a symbol printable area, the symbol printable area is an area of the detection image having a serial number, an actuation date or an actuation period of the image analysis apparatus.

14. The image analysis apparatus of claim 10, wherein each sub-image of the plurality of sub-images has M×N pixels, the operation processor transforms the plurality of sub-images into the pre-processing frequency domain data with M×N layers by discrete cosine transformation, a number of the plurality of masks is M×N, and M, N are positive values greater than or equal to 1.

15. The image analysis apparatus of claim 10, wherein the operation processor is further adapted to perform normalization procedure by excluding frequency response of the plurality of pre-processing frequency domain data outside a specific signal amplitude range.

16. The image analysis apparatus of claim 10, wherein the operation processor is further adapted to compute a noise between the predicted result and the target label, and to determine how to adjust the parameter of the plurality of pre-processing frequency domain data in each transformation phase in accordance with the noise.

17. The image analysis apparatus of claim 10, wherein the analysis model output layer comprises a plurality of prediction categories, the operation processor acquires the category determination result in accordance with distribution probability of all numerical results of the second inner product among the plurality of prediction categories.

18. The image analysis apparatus of claim 17, wherein the predicted result is a prediction category of the detection image having highest distribution probability among the plurality of prediction categories.

* * * * *